United States Patent
Zhu

(10) Patent No.: US 12,095,568 B2
(45) Date of Patent: Sep. 17, 2024

(54) HYBRID AUTOMATIC REPEAT REQUEST METHOD AND DEVICE

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 70 days.

(21) Appl. No.: 17/427,606

(22) PCT Filed: Feb. 1, 2019

(86) PCT No.: PCT/CN2019/074451
§ 371 (c)(1),
(2) Date: Jul. 30, 2021

(87) PCT Pub. No.: WO2020/155108
PCT Pub. Date: Aug. 6, 2020

(65) Prior Publication Data
US 2022/0103301 A1     Mar. 31, 2022

(51) Int. Cl.
*H04L 1/1812*     (2023.01)
*H04L 1/1867*     (2023.01)

(52) U.S. Cl.
CPC .......... *H04L 1/1816* (2013.01); *H04L 1/1887* (2013.01)

(58) Field of Classification Search
None
See application file for complete search history.

(56) References Cited

U.S. PATENT DOCUMENTS

2010/0254328 A1* 10/2010 McBeath ............... H04L 1/1861
                                                                370/329
2012/0327783 A1* 12/2012 Moon .................... H04L 5/001
                                                                370/241
(Continued)

FOREIGN PATENT DOCUMENTS

CN     105450368 A     3/2016
CN     105790897 A     7/2016
(Continued)

OTHER PUBLICATIONS

International Search Report of PCT Application No. PCT/CN2019/074451 dated Jul. 30, 2019 with English translation, (4p).
(Continued)

*Primary Examiner* — Benjamin Lamont
(74) *Attorney, Agent, or Firm* — Arch & Lake LLP

(57) ABSTRACT

The present invention relates to a hybrid automatic repeat request (HARQ) method and a device. The method comprises: receiving, on a first carrier of multiple carriers, failure indication information sent by user equipment (UE) indicating a transmission failure of downlink data, and then generating a retransmission scheduling command; and sending the retransmission scheduling command to the UE on a second carrier, wherein the retransmission scheduling command comprises retransmission indication information for performing a retransmission on a third carrier, wherein the first carrier and the second carrier are the same carrier or different carriers, the second carrier and the third carrier are the same carrier or different carriers, and the first carrier and the third carrier are different carriers.

15 Claims, 10 Drawing Sheets

---

101 — generating a retransmission scheduling instruction after receiving failure indication information sent by a user equipment indicating a transmission failure of downlink data on a first carrier of the multiple carriers 102 — sending the retransmission scheduling instruction to the UE on a second carrier, wherein the retransmission scheduling instruction includes retransmission indication information on performing a retransmission on a third carrier

(56) References Cited

U.S. PATENT DOCUMENTS

| | | | |
|---|---|---|---|
| 2015/0280882 A1 | 10/2015 | Lee et al. | |
| 2015/0327275 A1* | 11/2015 | Kwon | H04W 28/085 |
| | | | 370/236 |
| 2016/0037524 A1* | 2/2016 | Krzymien | H04L 1/1812 |
| | | | 370/329 |
| 2016/0323854 A1* | 11/2016 | Gao | H04L 5/14 |
| 2017/0279565 A1* | 9/2017 | Han | H04W 16/14 |
| 2018/0048431 A1* | 2/2018 | Wang | H04L 1/1864 |
| 2018/0115394 A1* | 4/2018 | Harada | H04W 72/23 |
| 2018/0213437 A1* | 7/2018 | Li | H04L 1/1812 |
| 2019/0059057 A1* | 2/2019 | Peng | H04W 52/146 |
| 2022/0103301 A1* | 3/2022 | Zhu | H04L 1/1816 |

FOREIGN PATENT DOCUMENTS

| | | | |
|---|---|---|---|
| CN | 105991246 A | | 10/2016 |
| CN | 106034015 A | * | 10/2016 |
| CN | 106549736 A | | 3/2017 |
| WO | 2016161584 A1 | | 10/2016 |

OTHER PUBLICATIONS

First Office Action issued to Chinese Application No. 201980000202.7 dated May 6, 2021 with English translation (15p).

* cited by examiner

HYBRID AUTOMATIC REPEAT REQUEST METHOD AND DEVICE

CROSS REFERENCE

This application is a 371 national phase application of PCT Application No. PCT/CN2019/074451, filed on Feb. 1, 2019, the entire content of which is incorporated herein by reference.

TECHNICAL FIELD

The present disclosure relates to the field of communication technologies, and in particular to a hybrid automatic repeat request method and device.

BACKGROUND

Sometimes, with an improvement of user equipment (UE) hardware performance, the UE can support multi-carrier transmission. No matter which carrier a base station transmits data on, the UE may fail to receive the data. In this case, a hybrid automatic repeat request (HARQ) technology can be adopted, and the base station retransmits the data failing to be received to the UE.

SUMMARY

Embodiments of the present disclosure provide a hybrid automatic repeat request method and device. The technical solution is as follows:

According to a first aspect of the embodiments of the present disclosure, there is provided a hybrid automatic repeat request method, which is applied to a base station supporting multiple carriers, and includes:

generating a retransmission scheduling instruction after receiving failure indication information sent by a user equipment indicating a transmission failure of downlink data on a first carrier of the multiple carriers; and sending the retransmission scheduling instruction to the UE on a second carrier, wherein the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

According to a second aspect of the embodiments of the present disclosure, there is provided a hybrid automatic repeat request method, which is applied to a user equipment supporting multiple carriers, and includes:

sending failure indication information indicating a transmission failure of downlink data on a first carrier of the multiple carriers to a base station; and receiving a retransmission scheduling instruction sent by the base station on a second carrier, wherein the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

According to a third aspect of the embodiments of the present disclosure, there is provided a hybrid automatic repeat request device, which is applied to a base station supporting multiple carriers, and includes:

a generating module, configured to generate a retransmission scheduling instruction after receiving failure indication information sent by a user equipment indicating a transmission failure of downlink data on a first carrier of the multiple carriers; and a first sending module, configured to send the retransmission scheduling instruction to the UE on a second carrier, wherein the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

According to a fourth aspect of the embodiments of the present disclosure, there is provided a hybrid automatic repeat request device, which is applied to a user equipment supporting multiple carriers, and includes:

a sending module, configured to send failure indication information indicating a transmission failure of downlink data on a first carrier of the multiple carriers to a base station; and a first receiving module, configured to receive a retransmission scheduling instruction sent by the base station on a second carrier, wherein the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

According to a fifth aspect of the embodiments of the present disclosure, there is provided a hybrid automatic repeat request device, including:

a processor; and a memory configured to store executable instructions of the processor;

wherein, the processor is configured to:

generate a retransmission scheduling instruction after receiving failure indication information sent by a user equipment indicating a transmission failure of downlink data on a first carrier of the multiple carriers; and send the retransmission scheduling instruction to the UE on a second carrier, wherein the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

According to a sixth aspect of the embodiments of the present disclosure, there is provided a hybrid automatic repeat request device, including:

a processor; and a memory configured to store executable instructions of the processor;

wherein, the processor is configured to:

send failure indication information indicating a transmission failure of downlink data on a first carrier of the multiple carriers to a base station; and receive a retransmission scheduling instruction sent by the base station on a second carrier, wherein the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

According to a seventh aspect of the embodiments of the present disclosure, there is provided a computer-readable storage medium having computer instructions stored thereon, wherein the instructions, when executed by a processor, implement the above method on a base station side.

According to an eighth aspect of the embodiments of the present disclosure, there is provided a computer-readable storage medium having computer instructions stored thereon, wherein the instructions, when executed by a processor, implement the above method on a user equipment side.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure.

Sometimes, both a base station and a UE can support multi-carrier transmission. However, no matter which carrier the base station transmits data on, the UE may fail to receive the data. In this case, a hybrid automatic repeat request (HARQ) technology can be adopted, and the base station retransmits the data failing to be received to the UE. However, the base station performs retransmission on an original carrier, and when a first transmission fails on the original carrier, the retransmission may also fail, especially for an unlicensed frequency band. Since a system working on the unlicensed frequency band needs to compete to occupy a channel resource, and a channel occupation time for the channel resource occupancy at a time is limited. In this case, it may cause that when a sending end, such as the base station, is preparing to send the data to be retransmitted, an unlicensed channel resource cannot be occupied to transmit the data to be retransmitted.

An inventor of the present disclosure has found that it is possible to consider performing the retransmission on another carrier to realize cross-carrier HARQ. The embodiments provide a scheduling scheme for cross-carrier retransmission.

Figure 1:
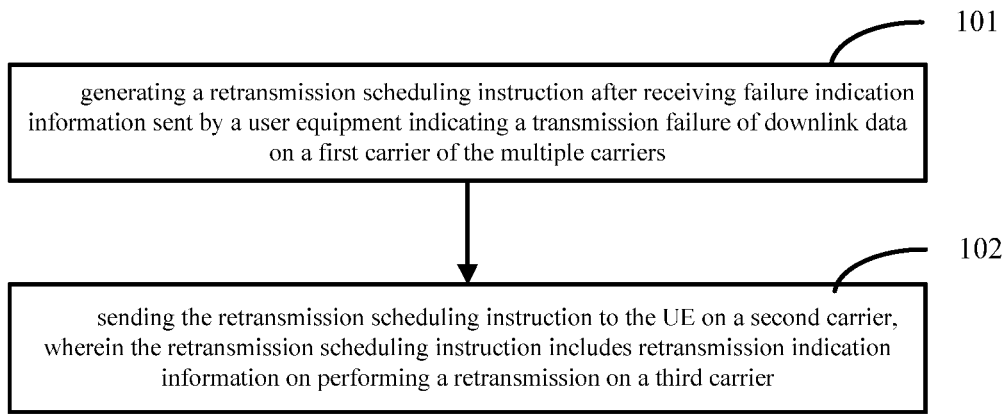
FIG. 1 is a flowchart showing a hybrid automatic repeat request method according to some embodiments.

FIG. 1 is a flowchart showing a hybrid automatic repeat request method according to some embodiments. The hybrid automatic repeat request method is used in an access network device such as a base station. As shown in FIG. 1, the method includes the following steps 101-102.

In the step 101, a retransmission scheduling instruction is generated after receiving failure indication information sent by a user equipment indicating a transmission failure of downlink data on a first carrier of the multiple carriers.

In the step 102, the retransmission scheduling instruction is sent to the UE on a second carrier, and the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

In some embodiments, the base station sends the data to the UE for the first time on the first carrier, and if the UE fails to receive the data, it sends the failure indication information, such as negative acknowledgement (NACK) information, to the base station. The base station can generate the cross-carrier retransmission scheduling instruction. Due to the cross-carrier retransmission, there are many feasible schemes.

As in scheme 1, the base station receives the NACK information on carrier 1 (as the first carrier), sends the retransmission scheduling instruction on the carrier 1 (as the second carrier), and retransmits the data on carrier 2 (as the third carrier). That is, the first carrier and the second carrier are the same carrier, and the second carrier and the third carrier are different carriers.

As in scheme 2, the base station receives the NACK information on the carrier 1 (as the first carrier), sends the retransmission scheduling instruction on the carrier 2 (as the second carrier), and retransmits the data on the carrier 2 (as the third carrier). That is, the first carrier and the second carrier are different carriers, and the second carrier and the third carrier are the same carrier.

As in scheme 3, the base station receives the NACK information on the carrier 1 (as the first carrier), sends the retransmission scheduling instruction on the carrier 2 (as the second carrier), and retransmits the data on carrier 3 (as the third carrier). That is, the first carrier and the second carrier are different carriers, and the second carrier and the third carrier are different carriers.

The base station can transmit the retransmission scheduling instruction and retransmit the data on any of the multiple carriers supported by both the base station and the UE. The base station can also determine the second carrier and the third carrier according to a network environment (such as interference, load, occupancy, etc.) on each carrier to improve a success rate of retransmission.

In some embodiments, the second carrier is a pre-configured carrier associated with the first carrier; and/or, the second carrier is a carrier determined according to a resource occupancy of each carrier of the multiple carriers.

If the first carrier and the second carrier are the same carrier, the UE can receive the retransmission scheduling instruction on the original carrier (that is, the first carrier and the second carrier).

If the first carrier and the second carrier are different carriers, there may be multiple implementations. Manner 1: the second carrier is the pre-configured carrier associated with the first carrier. A correspondence between the first carrier and the second carrier are stored both in the base station and the UE. After receiving the NACK information on the first carrier, the base station determines the second carrier associated with the first carrier according to the correspondence, and sends the retransmission scheduling instruction on the second carrier. After sending the NACK information on the first carrier, the UE determines the second carrier associated with the first carrier according to the correspondence, and monitors the second carrier so as to receive the retransmission scheduling instruction.

The base station may send the correspondence to the UE through a radio resource control (RRC) signaling, a media access control (MAC) control element (CE) signaling, a physical layer signaling, etc. in advance.

Manner 2: the second carrier is the carrier determined according to the resource occupancy of each carrier of the multiple carriers. The base station may arbitrarily determine the second carrier other than the first carrier among the supported multiple carriers, or may determine the second carrier according to the resource occupancy of each carrier, and may also consider other network environment factors when determining the second carrier. After sending the NACK information, the UE monitors each carrier other than the first carrier so as to receive the retransmission scheduling instruction.

The manner 1 and the manner 2 can be combined, that is, multiple second carriers associated with the first carrier are pre-configured, and one second carrier is determined from the multiple second carriers according to the resource occupancy.

The UE monitors the multiple second carriers associated with the first carrier, and then receives the retransmission scheduling instruction on one of the second carriers.

In some embodiments, the retransmission indication information includes: a first resource identifier and/or a second resource identifier;

the first resource identifier indicates to retransmit the data on the third carrier; and the second resource identifier indicates that the retransmitted data is data that has been transmitted on the first carrier and has not been successfully received by the user equipment.

In some embodiments, the retransmission indication information may include resource identifiers with multiple functions. The first resource identifier corresponds to the third carrier, that is, the UE is notified of resource information of data retransmission through the first resource identifier, so that the UE can smoothly receive the retransmitted data. The second resource identifier indicates that the retransmitted data is the data that has been transmitted on the first carrier and has not been successfully received by the user equipment, that is, the UE is notified of which part of the data is retransmitted through the second resource identifier.

Scheme 4: on the basis of the scheme 1, since the carrier 1 for sending the retransmission scheduling instruction and the carrier 2 for retransmitting the data are different carriers, the retransmission indication information may include the first resource identifier to notify the UE of the resource information of the data retransmission. The retransmission indication information may not include the second resource identifier, since it is the original carrier 1 that the retransmission scheduling instruction is sent on, the UE can know which part of the data is retransmitted. Of course, the second resource identifier may also be included to clearly notify the UE of which part of the data is retransmitted.

Scheme 5: on the basis of the scheme 2, since the carrier 1 for receiving the NACK information and the carrier 2 for sending the retransmission scheduling instruction are different carriers, the retransmission indication information may include the second resource identifier to notify the UE of which part of the data is retransmitted. The retransmission indication information may not include the first resource identifier, and the data is retransmitted on the carrier 2 that the retransmission scheduling instruction is sent on by default. After receiving the retransmission scheduling instruction on the carrier 2, the UE continues to wait for receiving the retransmitted data on the carrier 2. Of course, the first resource identifier may also be included to clearly notify the UE of the resource information of the data retransmission.

Scheme 6: on the basis of the scheme 3, since the carrier 1 for receiving the NACK information, the carrier 2 for sending the retransmission scheduling instruction, and the carrier 3 for retransmitting the data are all different carriers, the retransmission indication information includes the first resource identifier and the second resource identifier, so as to notify the UE of which part of the data is retransmitted and the resource information of the data retransmission.

In some embodiments, the first resource identifier includes: a first carrier identifier, and/or, a first hybrid automatic repeat request process identifier; and the second resource identifier includes: a second carrier identifier, and/or, a second hybrid automatic repeat request process identifier.

In some embodiments, the UE may be notified of on which carrier to receive the retransmitted data through the first carrier identifier. In some embodiments, only the first carrier identifier may be used, and the first hybrid automatic repeat request process identifier may not be used. The UE can adopt a default hybrid automatic repeat request process, or determine a hybrid automatic repeat request process by itself to receive the retransmitted data. Of course, the first hybrid automatic repeat request process identifier can also be sent to the UE to notify the UE of using which hybrid automatic repeat request process to receive the retransmitted data.

The UE is notified of the data on which carrier is retransmitted through the second carrier identifier. In some embodiments, only the second carrier identifier may be used, but the second hybrid automatic repeat request process identifier may not be used. The UE can know the data of which hybrid automatic repeat request process is retransmitted, since the UE has previously sent NACK (feedback information indicating reception failure) corresponding to the hybrid automatic repeat request process. Of course, the UE may also be notified of the data on which hybrid automatic repeat request process is retransmitted through the second hybrid automatic repeat request process identifier.

In some embodiments, the first hybrid automatic repeat request process identifier and the second hybrid automatic repeat request process identifier are unique among multiple hybrid automatic repeat request processes supported by the multiple carriers;

or the first hybrid automatic repeat request process identifier and the second hybrid automatic repeat request process identifier are unique among multiple hybrid automatic repeat request processes supported by one carrier.

In some embodiments, the first hybrid automatic repeat request process identifier and the second hybrid automatic repeat request process identifier are unique among the multiple hybrid automatic repeat request processes supported by the multiple carriers. All hybrid automatic repeat request processes supported by the multiple carriers are numbered in advance to obtain the unique hybrid automatic repeat request process identifier among the multiple carriers. A correspondence between each carrier and the hybrid automatic repeat request process identifier is established. For example, the carrier 1 corresponds to a HARQ process 1-HARQ process 3, the carrier 2 corresponds to a HARQ process 4-HARQ process 5, and the carrier 3 corresponds to a HARQ process 6-HARQ process 8. The base station may send the correspondence to the UE through the radio resource control (RRC) signaling, the media access control (MAC)control element (CE) signaling, the physical layer signaling, etc. in advance.

After receiving the first hybrid automatic repeat request process identifier and the second hybrid automatic repeat request process identifier, the UE can determine the corresponding carrier and hybrid automatic repeat request process according to the correspondence, and learn the data on which hybrid automatic repeat request process of which carrier is retransmitted, and also learn on which hybrid automatic repeat request process of which carrier to receive the retransmitted data. Since the corresponding carrier can be learned through the first hybrid automatic repeat request process identifier and the second hybrid automatic repeat request process identifier, the carrier identifier may not be sent to the UE. Of course, the carrier identifier may also be sent to the UE.

For example, the first hybrid automatic repeat request process identifier is HARQ process 6, and the second hybrid automatic repeat request process identifier is HARQ process 3. The UE can then receive the retransmitted data of the HARQ process 3 of the carrier 1 on the HARQ process 6 of the carrier 3.

There may also be another implementation. The first hybrid automatic repeat request process identifier and the second hybrid automatic repeat request process identifier are unique among the multiple hybrid automatic repeat request processes supported by one carrier, and the retransmission indication information further includes: the carrier identifier. In some embodiments, the hybrid automatic repeat request processes are individually numbered for each carrier so as to obtain the unique hybrid automatic repeat request process identifier for the carrier. For example, the carrier 1 corresponds to the HARQ process 1-HARQ process 3, the carrier 2 corresponds to the HARQ process 1-HARQ process 2, and the carrier 3 corresponds to the HARQ process 1-HARQ process 3. Since the hybrid automatic repeat request process identifier is not unique among the multiple carriers, the retransmission indication information also includes the carrier identifier, for example, the retransmission indication information is (carrier 1, HARQ process 1).

For example, the first hybrid automatic repeat request process identifier is the HARQ process 1 on the carrier 3, and the corresponding first retransmission indication information is (carrier 3, HARQ process 1); the second hybrid automatic repeat request process identifier is the HARQ process 1 on the carrier 1, and the corresponding second retransmission indication information is (carrier 1, HARQ process 1). Then, the UE receives the retransmitted data of the HARQ process 1 on the carrier 1 in the HARQ process 1 on the carrier 3.

Based on the above several embodiments, the UE can be notified of on which carrier to receive the retransmitted data only through the first carrier identifier. Furthermore, the UE can also use the default hybrid automatic repeat request process, or determine the hybrid automatic repeat request process by itself to determine on which hybrid automatic repeat request process of which carrier to receive the retransmitted data. In another preferred example, the UE can be only notified of the first hybrid automatic repeat request process identifier, and determine on which hybrid automatic repeat request process of which carrier to receive the retransmitted data according to the correspondence between each carrier and the hybrid automatic repeat request process identifier. In another preferred example, the UE can be notified of on which hybrid automatic repeat request process of which carrier to receive the retransmitted data through the first carrier identifier and the first hybrid automatic repeat request process identifier jointly.

On the other hand, the UE can be notified of receiving the retransmitted data on which carrier only through the second carrier identifier. Furthermore, the UE has previously sent the NACK (the feedback information indicating the reception failure) corresponding to the hybrid automatic repeat request process, so the UE can determine the retransmitted data is of which hybrid automatic repeat request process by itself. In another preferred example, the UE can be only notified of the second hybrid automatic repeat request process identifier, and determine to receive the retransmitted data of which hybrid automatic repeat request process on which carrier according to the correspondence between each carrier and the hybrid automatic repeat request process identifier. In another preferred example, the UE can be notified of receiving the retransmitted data of which hybrid automatic repeat request process on which carrier through the second carrier identifier and the second hybrid automatic repeat request process identifier jointly.

For example, the first resource identifier only includes: the first carrier identifier, such as carrier 1, and the second resource identifier only includes: the second hybrid automatic repeat request process identifier, such as HARQ process 4. The UE can receive the retransmitted data of the HARQ process 4 of the carrier 2 on carrier 1 (the identifiers of the multiple hybrid automatic repeat request processes supported by the multiple carriers are unique among the multiple carriers).

For example, the first resource identifier only includes: the first carrier identifier, such as carrier 2, and the second resource identifier includes: the second carrier identifier and the second hybrid automatic repeat request process identifier, such as carrier 1 and HARQ process 3, the UE can receive the retransmitted data of the HARQ process 3 of the carrier 1 on the carrier 2 (the identifiers of the multiple hybrid automatic repeat request processes supported by one carrier are unique in a single carrier).

For example, the first resource identifier only includes: the first carrier identifier, such as carrier 1, and the second resource identifier only includes: the second carrier identifier, such as carrier 2. The UE can receive the retransmitted data of the carrier 2 on the carrier 1. The UE can determine one hybrid automatic repeat request process on the carrier 1 by itself to receive the retransmitted data. The UE may know the data of which hybrid automatic repeat request process on the carrier 2 is retransmitted in advance.

In some embodiments, the retransmission scheduling instruction is a retransmission scheduling instruction specifically for cross-carrier data retransmission.

In some embodiments, the retransmission scheduling instruction is a type of downlink control information (DCI), and a new instruction format of DCI can be designed to be specifically for the retransmission scheduling instructions for the cross-carrier data retransmission. According to the new instruction format, the UE can learn the retransmission scheduling instruction is the retransmission scheduling instruction for the cross-carrier data retransmission, and will use a corresponding strategy to parse the retransmission scheduling instruction and receive the retransmitted data.

Alternatively, the retransmission scheduling instruction includes an indicator bit, and when the indicator bit takes a first value, it indicates that the retransmission scheduling instruction is a retransmission scheduling instruction for the cross-carrier data retransmission; when the indicator bit takes a second value, it indicates that the retransmission scheduling instruction is a retransmission scheduling instruction for single carrier data retransmission.

For example, the first value is 0 and the second value is 1. The indicator bit can also have other values, as long as these two values are different, which is applicable to some embodiments.

In some embodiments, an instruction identifier of the existing retransmission scheduling instruction can be used, and the indicator bit can be added to the existing retransmission scheduling instruction. The indicator bit is used to mark whether the retransmission scheduling instruction is the retransmission scheduling instruction for the cross-carrier data retransmission, or the retransmission scheduling instruction for the single-carrier data retransmission. The UE can adopt the corresponding strategy to receive the retransmitted data by identifying the value of the indicator bit.

Alternatively, a cyclic redundancy check (CRC) in the retransmission scheduling instruction is scrambled with a sequence, and the sequence is a sequence specifically for the cross-carrier data retransmission.

In some embodiments, the instruction identifier and instruction format of the existing retransmission scheduling instruction can be used. A specific sequence is designed for the retransmission scheduling instruction for the cross-carrier data retransmission, and this sequence is used to scramble the CRC. If the UE successfully descrambles the CRC using the specific sequence, it determines that the retransmission scheduling instruction is used for the cross-carrier data retransmission, and can adopt the corresponding strategy to receive the retransmitted data.

In some embodiments, the method further includes: step A.

In the step A, the data is retransmitted on the third carrier.

In some embodiments, the method further includes: step A1-step A2.

In the step A1, it is determined whether there is an idle resource for retransmitting the data on the first carrier within a preset time period.

In the step A2, when there is no idle resource for retransmitting the data on the first carrier within the preset time period, the data is retransmitted on the third carrier.

In some embodiments, after receiving the NACK information, the base station may first determine whether there is the idle resource for retransmitting the data on the first carrier within the preset time period, and if so, the data is retransmitted on the first carrier; if not, then it is detected whether there is an idle resource for retransmitting the data on the third carrier, and if so, the cross-carrier data retransmission scheme is adopted. After sending the NACK information, the UE first waits for receiving the retransmitted data within the preset time period, and if it does not receive the retransmitted data, the UE waits for receiving the retransmitted data on the third carrier. In some embodiments, the base station can be given a certain buffer period, and the cross-carrier data retransmission scheme does not necessarily to be adopted immediately.

An implementation process is described in detail below through embodiments.

Figure 2:
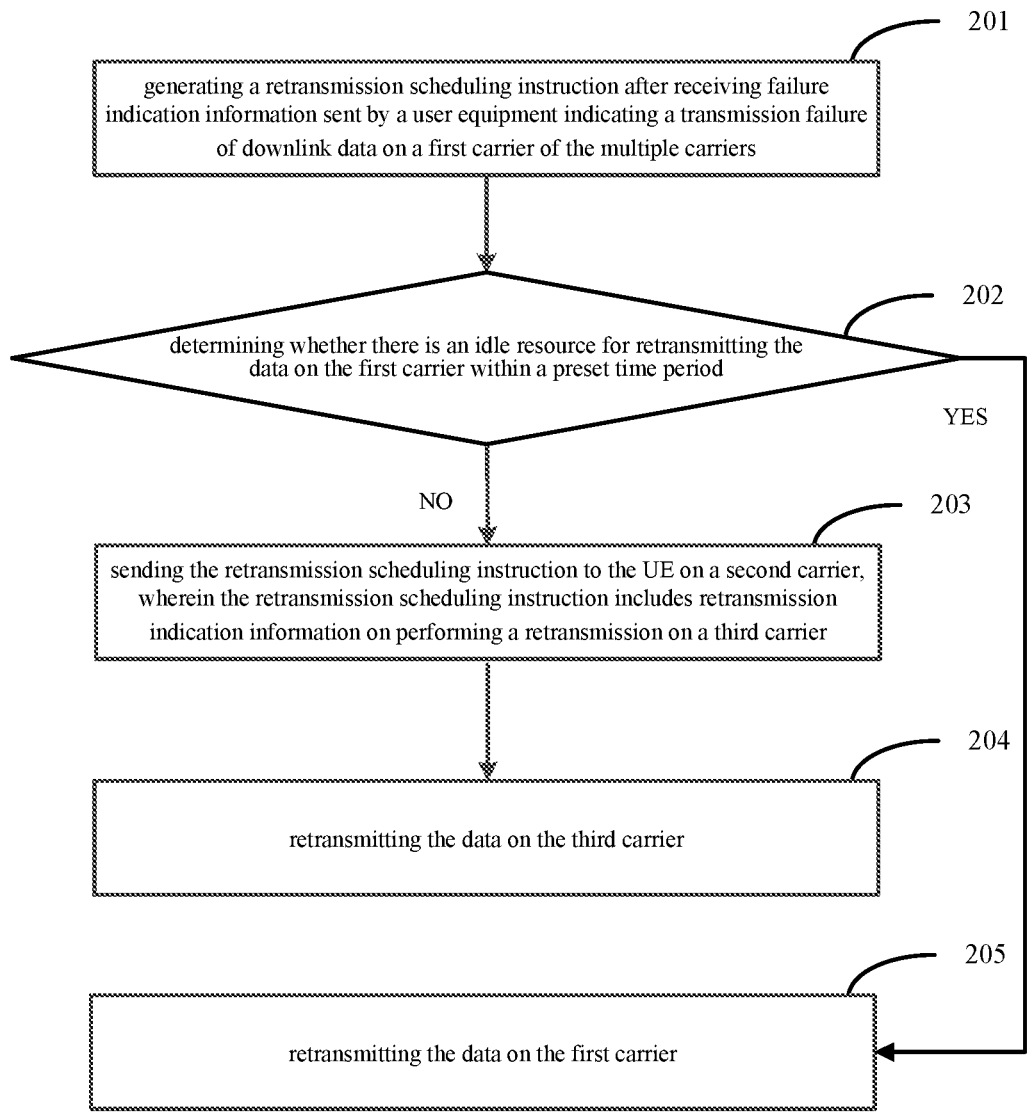
FIG. 2 is a flowchart showing a hybrid automatic repeat request method according to some embodiments.

FIG. 2 is a flowchart showing a hybrid automatic repeat request method according to some embodiments. The hybrid automatic repeat request method is used in an access network device such as a base station. As shown in FIG. 2, the method includes the following steps 201-205.

In the step 201, a retransmission scheduling instruction is generated after receiving failure indication information sent by a user equipment indicating a transmission failure of downlink data on a first carrier of the multiple carriers.

In the step 202, it is determined whether there is an idle resource for retransmitting the data on the first carrier within a preset time period. When there is no idle resource for retransmitting the data on the first carrier within the preset time period, it proceeds to the step 203; when there is the idle resource for retransmitting the data on the first carrier within the preset time period, it proceeds to the step 205.

In the step 203, the retransmission scheduling instruction is sent to the UE on a second carrier, and the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

In the step 204, the data is retransmitted on the third carrier.

In the step 205, the data is retransmitted on the first carrier.

The implementation process on the base station side has been introduced above, and a corresponding UE side has also been improved. An implementation process on the UE side is introduced below.

Figure 3:
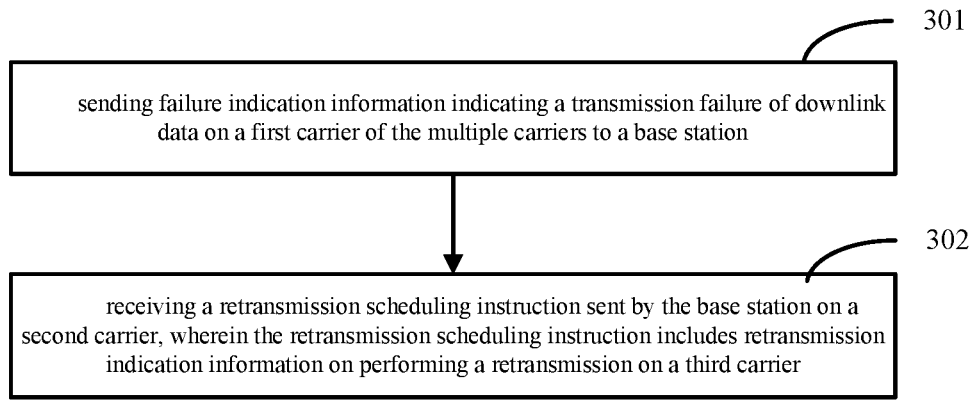
FIG. 3 is a flowchart showing a hybrid automatic repeat request method according to some embodiments.

FIG. 3 is a flowchart showing a hybrid automatic repeat request method according to some embodiments. The hybrid automatic repeat request method is used in a user equipment supporting multiple carriers, which may be a mobile phone, a computer, a digital broadcasting terminal, a messaging device, a game console, a tablet device, a medical device, a fitness device, a personal digital assistant, etc. As shown in FIG. 3, the method includes the following steps 301-302.

In the step 301, failure indication information indicating a transmission failure of downlink data is sent to a base station on a first carrier of the multiple carriers.

In the step 302, a retransmission scheduling instruction sent by the base station is received on a second carrier, and the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

In some embodiments, the UE can send NACK information on the first carrier, then receive the retransmitted data on the third carrier, and can support cross-carrier data retransmission.

Based on scheme 1, the UE sends the NACK information on carrier 1 (as the first carrier), receives the retransmission scheduling instruction on the carrier 1 (as the second carrier), and receives the retransmitted data on carrier 2 (as the third carrier). That is, the first carrier and the second carrier are the same carrier, and the second carrier and the third carrier are different carriers.

Based on scheme 2, the UE sends the NACK information on the carrier 1 (as the first carrier), receives the retransmission scheduling instruction on the carrier 2 (as the second carrier), and receives the retransmitted data on the carrier 2 (as the third carrier). That is, the first carrier and the second carrier are different carriers, and the second carrier and the third carrier are the same carrier.

Based on scheme 3, the UE sends the NACK information on the carrier 1 (as the first carrier), receives the retransmission scheduling instruction on the carrier 2 (as the second carrier), and receives the retransmitted data on the carrier 3 (as the third carrier). That is, the first carrier and the second carrier are different carriers, and the second carrier and the third carrier are different carriers.

The UE may implement the cross-carrier data retransmission according to a scheduling instruction of the base station.

In some embodiments, before the step 302, the method further includes: step B1 or step B2.

In the step B1, the second carrier pre-configured and associated with the first carrier is monitored.

In some embodiments, the UE may know the second carrier associated with the first carrier, and may only monitor the second carrier in order to receive the retransmission scheduling instruction. There may be multiple associated second carriers, and the UE monitors the multiple second carriers.

In the step B2, the second carrier other than the first carrier among the multiple carriers is monitored.

In some embodiments, the UE may monitor all carriers (all as second carriers) except the first carrier in order to receive the retransmission scheduling instruction.

In some embodiments, the retransmission indication information includes: a first resource identifier and/or a second resource identifier;

the first resource identifier indicates to retransmit the data on the third carrier; and the second resource identifier indicates that the retransmitted data is data that has been transmitted on the first carrier and has not been successfully received by the user equipment.

In some embodiments, the retransmission indication information includes: a first hybrid automatic repeat request process identifier, and/or, a second hybrid automatic repeat request process identifier;

the first hybrid automatic repeat request process identifier indicates to retransmit the data on the third carrier; and the second hybrid automatic repeat request process identifier indicates the retransmitted data is data that has been transmitted on the first carrier and has not been successfully received by the user equipment.

In some embodiments, the retransmission indication information may include resource identifiers with multiple functions. The first resource identifier corresponds to the third carrier, that is, the UE can learn resource information of data retransmission according to the first resource identifier, so as to smoothly receive the retransmitted data. The second resource identifier indicates that the retransmitted data is the data that has been transmitted on the first carrier and has not been successfully received by the user equipment, that is, the UE can learn which part of the data is retransmitted according to the second resource identifier.

Scheme 4: on the basis of the scheme 1, since the carrier 1 for sending the retransmission scheduling instruction and the carrier 2 for retransmitting the data are different carriers, the retransmission indication information may include the first resource identifier, and the UE can learn the resource information of the data retransmission. The retransmission indication information may not include the second resource identifier, since it is the original carrier 1 that the retransmission scheduling instruction is sent on, the UE can know which part of the data is retransmitted. Of course, the second resource identifier may also be included, so that the UE clearly knows which part of the data is retransmitted.

Scheme 5, on the basis of the scheme 2, since the carrier 1 for receiving the NACK information and the carrier 2 for sending the retransmission scheduling instruction are different carriers, the retransmission indication information may include the second resource identifier, and the UE can learn which part of the data is retransmitted. The retransmission indication information may not include the first resource identifier, and the data is retransmitted on the carrier 2 that that the retransmission scheduling instruction is sent on by default. After receiving the retransmission scheduling instruction on the carrier 2, the UE continues to wait for receiving the retransmitted data on the carrier 2. Of course, the first resource identifier may also be included, so that the UE clearly knows the resource information of the data retransmission.

Scheme 6: on the basis of the scheme 3, since the carrier 1 for receiving the NACK information, the carrier 2 for sending the retransmission scheduling instruction, and the carrier 3 for retransmitting the data are all different carriers, the retransmission indication information includes the first resource identifier and the second resource identifier, so that the UE clearly knows which part of the data is retransmitted and the resource information of the data retransmission.

In some embodiments, the first resource identifier includes: a first carrier identifier, and/or, a first hybrid automatic repeat request process identifier; and the second resource identifier includes: a second carrier identifier, and/or, a second hybrid automatic repeat request process identifier.

In some embodiments, the UE can learn on which carrier to receive the retransmitted data through the first carrier identifier. The UE may also learn to use which hybrid automatic repeat request process to receive the retransmitted data through the first hybrid automatic repeat request process identifier.

The UE can learn the data on which carrier is retransmitted through the second carrier identifier. The UE may also learn the data on which hybrid automatic repeat request process is retransmitted through the second hybrid automatic repeat request process identifier.

In some embodiments, the first hybrid automatic repeat request process identifier and the second hybrid automatic repeat request process identifier are unique among multiple hybrid automatic repeat request processes supported by the multiple carriers.

Alternatively, the first hybrid automatic repeat request process identifier and the second hybrid automatic repeat request process identifier are unique among multiple hybrid automatic repeat request processes supported by one carrier.

In some embodiments, the first hybrid automatic repeat request process identifier and the second hybrid automatic repeat request process identifier are unique among the multiple hybrid automatic repeat request processes supported by the multiple carriers. All hybrid automatic repeat request processes supported by the multiple carriers are numbered in advance to obtain the unique hybrid automatic repeat request process identifier among the multiple carriers. A correspondence between each carrier and the hybrid automatic repeat request process identifier is established. For example, the carrier 1 corresponds to a HARQ process 1-HARQ process 3, the carrier 2 corresponds to a HARQ process 4-HARQ process 5, and the carrier 3 corresponds to a HARQ process 6-HARQ process 8. After receiving the first hybrid automatic repeat request process identifier and the second hybrid automatic repeat request process identifier, the UE can determine the corresponding carrier and hybrid automatic repeat request process according to the correspondence, and learn the data on which hybrid automatic repeat request process of which carrier is retransmitted, and also learn on which hybrid automatic repeat request process of which carrier to receive the retransmitted data.

For example, the first hybrid automatic repeat request process identifier is HARQ process 6, and the second hybrid automatic repeat request process identifier is HARQ process 3. The UE can then receive the retransmitted data of the HARQ process 3 of the carrier 1 on the HARQ process 6 of the carrier 3.

There may also be another implementation. The first hybrid automatic repeat request process identifier and the second hybrid automatic repeat request process identifier are unique among the multiple hybrid automatic repeat request processes supported by one carrier, and the retransmission indication information also includes: a carrier identifier. In some embodiments, the hybrid automatic repeat request process is individually numbered for each carrier so as to obtain the unique hybrid automatic repeat request process identifier for the carrier. For example, the carrier 1 corresponds to the HARQ process 1-HARQ process 3, the carrier 2 corresponds to the HARQ process 1-HARQ process 2, and the carrier 3 corresponds to the HARQ process 1-HARQ process 3. Since the hybrid automatic repeat request process identifier is not unique among the multiple carriers, the retransmission indication information also includes the carrier identifier, for example, the retransmission indication information is (carrier 1, HARQ process 1).

For example, the first hybrid automatic repeat request process identifier is the HARQ process 1 on the carrier 3, and the corresponding first retransmission indication information is (carrier 3, HARQ process 1); the second hybrid automatic repeat request process identifier is the HARQ process 1 on the carrier 1, and the corresponding second retransmission indication information is (carrier 1, HARQ process 1). Then, the UE receives the retransmitted data of the HARQ process 1 on the carrier 1 in the HARQ process 1 on the carrier 3.

In some embodiments, the retransmission scheduling instruction is a retransmission scheduling instruction specifically for cross-carrier data retransmission.

In some embodiments, the retransmission scheduling instruction is a type of downlink control information (DCI), and a new instruction format of DCI can be designed to be specifically for the retransmission scheduling instructions for the cross-carrier data retransmission. According to the new instruction format, the UE can learn the retransmission scheduling instruction is the retransmission scheduling instruction for the cross-carrier data retransmission, and will use a corresponding strategy to parse the retransmission scheduling instruction and receive the retransmitted data.

Alternatively, the retransmission scheduling instruction includes an indicator bit, and when the indicator bit takes a first value, it indicates that the retransmission scheduling instruction is a retransmission scheduling instruction for the cross-carrier data retransmission; when the indicator bit takes a second value, it indicates that the retransmission scheduling instruction is a retransmission scheduling instruction for single carrier data retransmission.

For example, the first value is 0 and the second value is 1. The indicator bit can also have other values, as long as these two values are different, which is applicable to some embodiments.

In some embodiments, an instruction identifier of the existing retransmission scheduling instruction can be used, and the indicator bit can be added to the existing retransmission scheduling instruction. The indicator bit is used to mark whether the retransmission scheduling instruction is the retransmission scheduling instruction for the cross-carrier data retransmission, or the retransmission scheduling instruction for the single-carrier data retransmission. The UE can adopt the corresponding strategy to receive the retransmitted data by identifying the value of the indicator bit.

Alternatively, a cyclic redundancy check (CRC) in the retransmission scheduling instruction is scrambled with a sequence, and the sequence is a sequence specifically for the cross-carrier data retransmission.

In some embodiments, the instruction identifier and instruction format of the existing retransmission scheduling instruction can be used. A specific sequence is designed for the retransmission scheduling instruction for the cross-carrier data retransmission, and this sequence is used to scramble the CRC. If the UE successfully descrambles the CRC using the specific sequence, it determines that the retransmission scheduling instruction is used for the cross-carrier data retransmission, and can adopt the corresponding strategy to receive the retransmitted data.

In some embodiments, the method further includes: step C.

In the step C, the retransmitted data is received on the third carrier.

In some embodiments, the method further includes: step C1-step C2.

In the step C1, it is determined whether the retransmitted data is received on the first carrier within a preset time period.

In the step C2, when the retransmitted data is not received on the first carrier within the preset time period, the retransmitted data is received on the third carrier.

In some embodiments, after sending the NACK information, the UE first waits for receiving the retransmitted data on the first carrier within the preset time period. If it is not received, the retransmitted data is received on the third carrier.

The implementation process on the UE side is described in detail below through embodiments.

Figure 4:
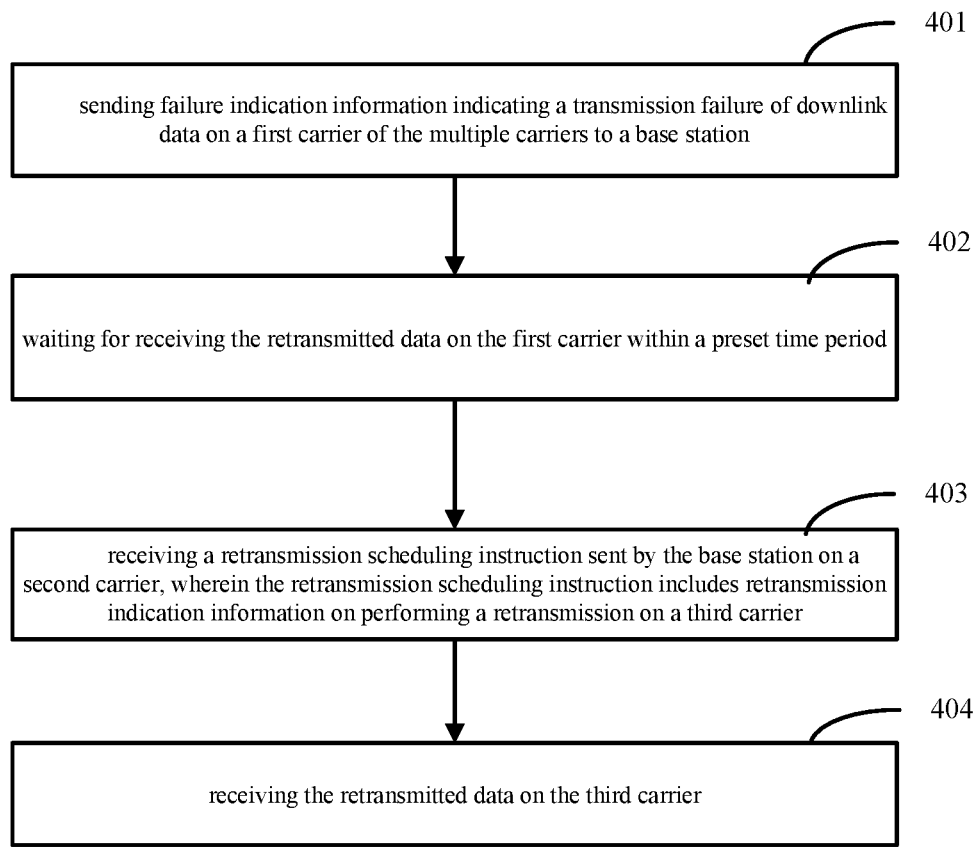
FIG. 4 is a flowchart showing a hybrid automatic repeat request method according to some embodiments.

FIG. 4 is a flowchart showing a hybrid automatic repeat request method according to some embodiments. The hybrid automatic repeat request method is used in a user equipment supporting multiple carriers, which may be a mobile phone, a computer, a digital broadcasting terminal, a messaging device, a game console, a tablet device, a medical device, a fitness device, a personal digital assistant, etc. As shown in FIG. 4, the method includes the following steps 401-405.

In the step 401, failure indication information indicating a transmission failure of downlink data is sent to a base station on a first carrier of the multiple carriers.

In the step 402, the retransmitted data is waited to be received on the first carrier within a preset time period. If the retransmitted data is not received, it proceeds to step 403. This step is equivalent to determining whether the retransmitted data is received on the first carrier within the preset time period.

In the step 403, a retransmission scheduling instruction sent by the base station is received on a second carrier, and the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

In the step 404, the retransmitted data is received on the third carrier.

The following describes the implementation process in conjunction with both the base station side and the UE side.

Figure 5:
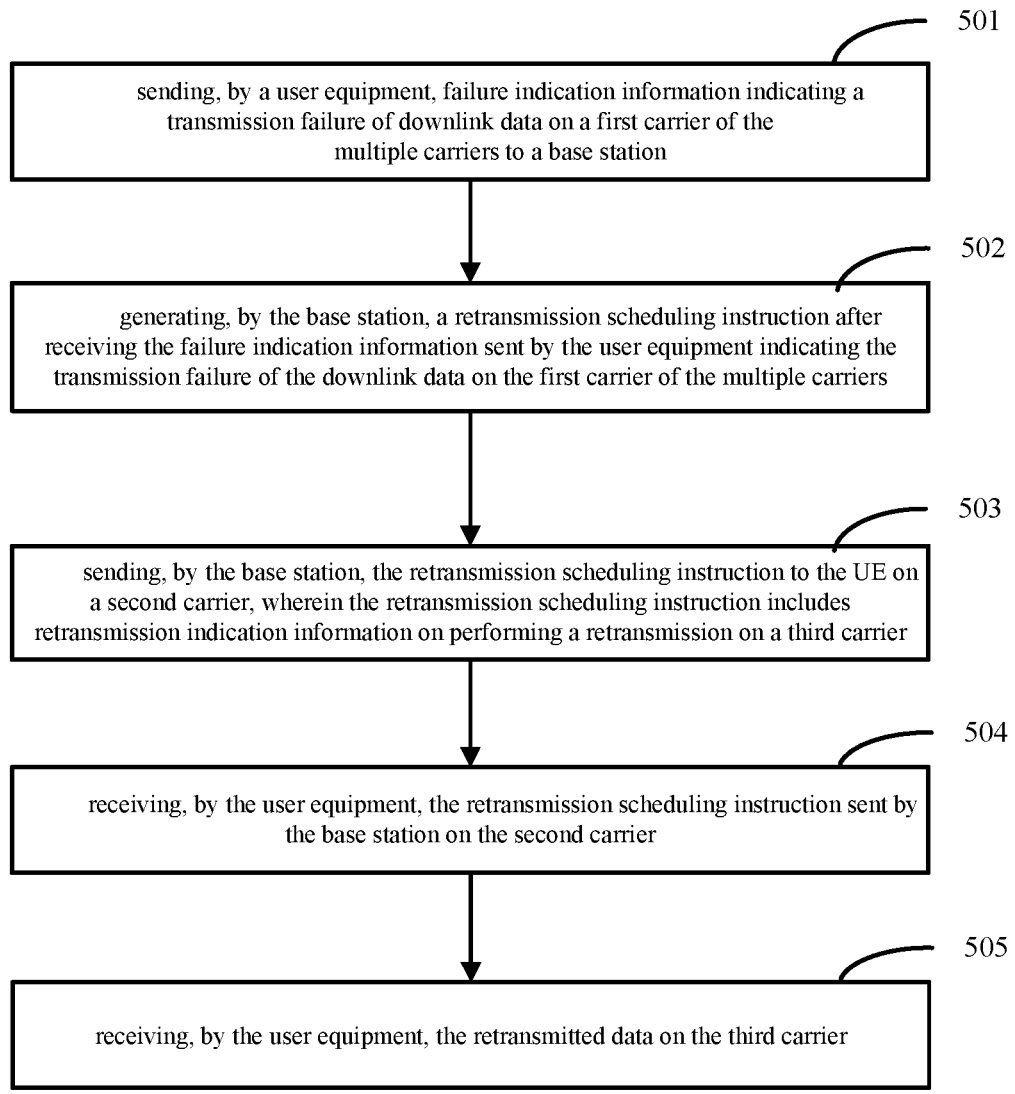
FIG. 5 is a flowchart showing a hybrid automatic repeat request method according to some embodiments.

FIG. 5 is a flowchart showing a hybrid automatic repeat request method according to some embodiments. As shown in FIG. 5, the method includes the following steps 501-505.

In the step 501, the user equipment sends failure indication information indicating a transmission failure of downlink data to the base station on a first carrier of multiple carriers.

In the step 502, the base station generates a retransmission scheduling instruction after receiving the failure indication information indicating the transmission failure of the downlink data sent by the user equipment on the first carrier of the multiple carriers.

In the step 503, the base station sends the retransmission scheduling instruction to the UE on a second carrier; the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

In the step 504, the user equipment receives the retransmission scheduling instruction sent by the base station on the second carrier.

In the step 505, the user equipment receives the retransmitted data on the third carrier.

The above embodiments can be freely combined according to actual applications.

The following are device embodiments of the present disclosure, which can be configured to implement the method embodiments of the present disclosure.

Figure 6:
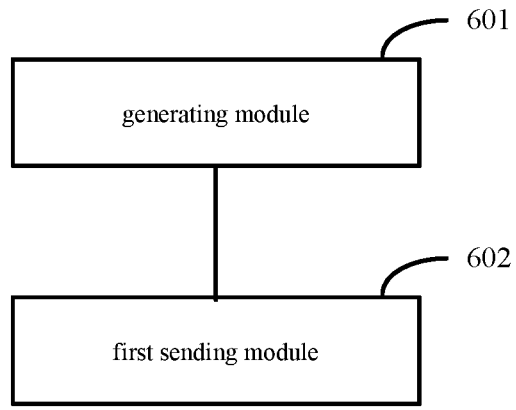
FIG. 6 is a block diagram showing a hybrid automatic repeat request device according to some embodiments.

FIG. 6 is a block diagram showing a hybrid automatic repeat request device according to some embodiments. The device can be implemented as part or all of an electronic device through software, hardware, or a combination of both, and applied to a base station supporting multiple carriers. Referring to FIG. 6, the hybrid automatic repeat request device includes a generating module 601 and a first sending module 602.

The generating module 601 is configured to generate a retransmission scheduling instruction after receiving failure indication information sent by a user equipment indicating a transmission failure of downlink data on a first carrier of the multiple carriers.

The first sending module 602 configured to send the retransmission scheduling instruction to the UE on a second carrier, and the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

In some embodiments, the second carrier is a pre-configured carrier associated with the first carrier; and/or the second carrier is a carrier determined according to a resource occupancy of each carrier of the multiple carriers.

In some embodiments, the retransmission indication information includes: a first resource identifier and/or a second resource identifier;

the first resource identifier indicates to retransmit the data on the third carrier; and the second resource identifier indicates that the retransmitted data is data that has been transmitted on the first carrier and has not been successfully received by the user equipment.

In some embodiments, the first resource identifier includes: a first carrier identifier, and/or, a first hybrid automatic repeat request process identifier; and the second resource identifier includes: a second carrier identifier, and/or, a second hybrid automatic repeat request process identifier.

In some embodiments, the first hybrid automatic repeat request process identifier and the second hybrid automatic repeat request process identifier are unique among multiple hybrid automatic repeat request processes supported by the multiple carriers; or the first hybrid automatic repeat request process identifier and the second hybrid automatic repeat request process identifier are unique among multiple hybrid automatic repeat request processes supported by one carrier.

In some embodiments, the retransmission scheduling instruction is a retransmission scheduling instruction specifically for cross-carrier data retransmission; or the retransmission scheduling instruction includes an indicator bit, and when the indicator bit takes a first value, it indicates that the retransmission scheduling instruction is a retransmission scheduling instruction for the cross-carrier data retransmission; when the indicator bit takes a second value, it indicates that the retransmission scheduling instruction is a retransmission scheduling instruction for single carrier data retransmission; or a cyclic redundancy check (CRC) in the retransmission scheduling instruction is scrambled with a sequence, and the sequence is a sequence specifically for the cross-carrier data retransmission.

Figure 7:
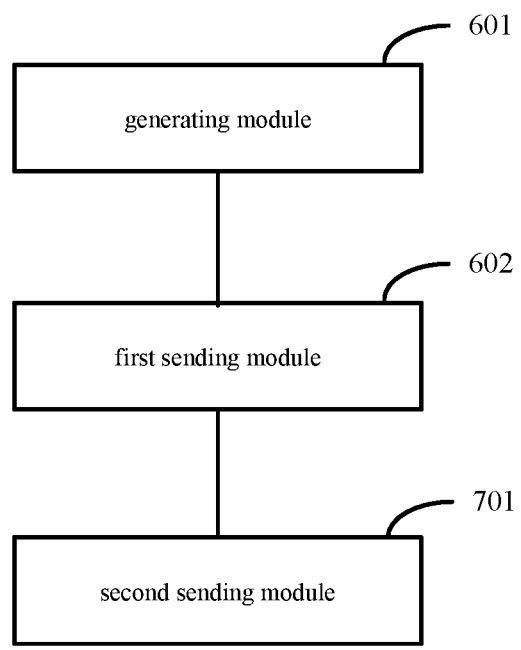
FIG. 7 is a block diagram showing a hybrid automatic repeat request device according to some embodiments.

In some embodiments, as shown in FIG. 7, the device further includes: a second sending module 701.

The second sending module 701 is configured to retransmit the data on the third carrier.

Figure 8:
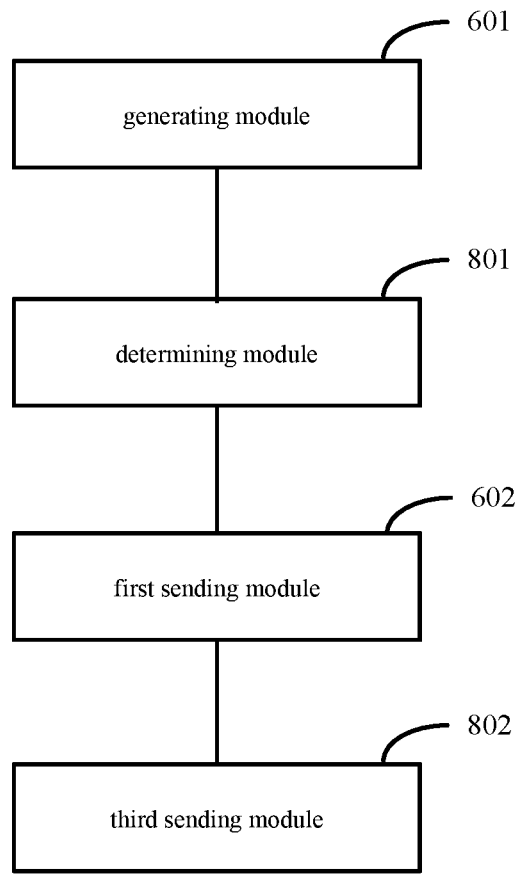
FIG. 8 is a block diagram showing a hybrid automatic repeat request device according to some embodiments.

In some embodiments, as shown in FIG. 8, the device further includes: a determining module 801 and a third sending module 802.

The determining module 801 is configured to determine whether there is an idle resource for retransmitting the data on the first carrier within a preset time period.

The third sending module 802 is configured to retransmit the data on the third carrier when there is no idle resource for retransmitting the data on the first carrier within the preset time period.

Figure 9:
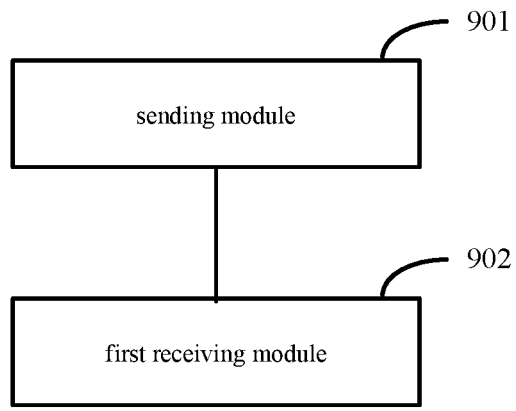
FIG. 9 is a block diagram showing a hybrid automatic repeat request device according to some embodiments.

FIG. 9 is a block diagram showing a hybrid automatic repeat request device according to some embodiments. The device can be implemented as part or all of an electronic device through software, hardware, or a combination of both, and applied to a user equipment supporting multiple carriers. Referring to FIG. 9, the hybrid automatic repeat request device includes a sending module 901 and a first receiving module 902.

The sending module 901 is configured to send failure indication information indicating a transmission failure of downlink data on a first carrier of the multiple carriers to a base station.

The first receiving module 902 is configured to receive a retransmission scheduling instruction sent by the base station on a second carrier, and the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

Figure 10:
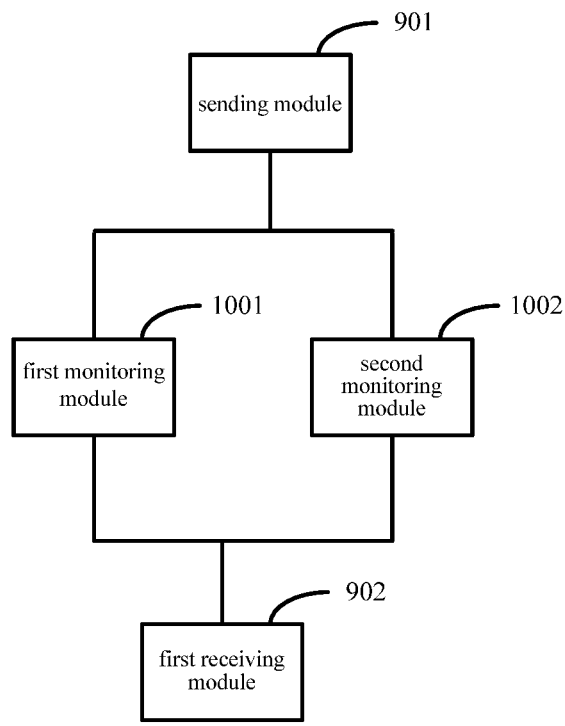
FIG. 10 is a block diagram showing a hybrid automatic repeat request device according to some embodiments.

In some embodiments, as shown in FIG. 10, the device further includes: a first monitoring module 1001 or a second monitoring module 1002.

The first monitoring module 1001 is configured to monitor the second carrier pre-configured and associated with the first carrier.

The second monitoring module 1002 is configured to monitor the second carrier other than the first carrier among the multiple carriers.

In some embodiments, the retransmission indication information includes: a first resource identifier and/or a second resource identifier;

the first resource identifier indicates to retransmit the data on the third carrier; and the second resource identifier indicates that the retransmitted data is data that has been transmitted on the first carrier and has not been successfully received by the user equipment.

In some embodiments, the first resource identifier includes: a first carrier identifier, and/or, a first hybrid automatic repeat request process identifier; and the second resource identifier includes: a second carrier identifier, and/or, a second hybrid automatic repeat request process identifier.

In some embodiments, the first hybrid automatic repeat request process identifier and the second hybrid automatic repeat request process identifier are unique among multiple hybrid automatic repeat request processes supported by the multiple carriers; or the first hybrid automatic repeat request process identifier and the second hybrid automatic repeat request process identifier are unique among multiple hybrid automatic repeat request processes supported by one carrier.

In some embodiments, the retransmission scheduling instruction is a retransmission scheduling instruction specifically for cross-carrier data retransmission; or the retransmission scheduling instruction includes an indicator bit, and when the indicator bit takes a first value, it indicates that the retransmission scheduling instruction is a retransmission scheduling instruction for the cross-carrier data retransmission; when the indicator bit takes a second value, it indicates that the retransmission scheduling instruction is a retransmission scheduling instruction for single carrier data retransmission; or a cyclic redundancy check (CRC) in the retransmission scheduling instruction is scrambled with a sequence, and the sequence is a sequence specifically for the cross-carrier data retransmission.

Figure 11:
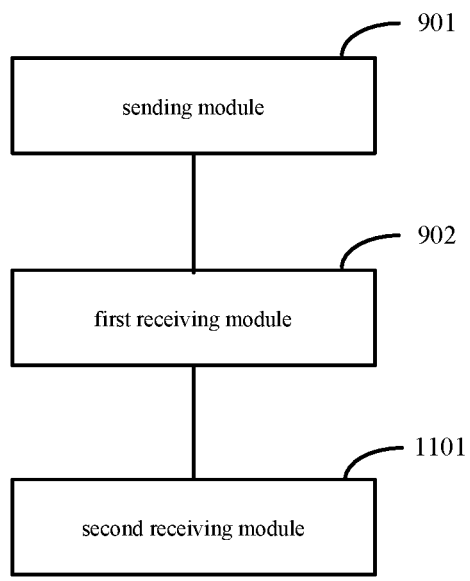
FIG. 11 is a block diagram showing a hybrid automatic repeat request device according to some embodiments.

In some embodiments, as shown in FIG. 11, the device further includes: a second receiving module 1101.

The second receiving module 1101 is configured to receive the retransmitted data on the third carrier.

Figure 12:
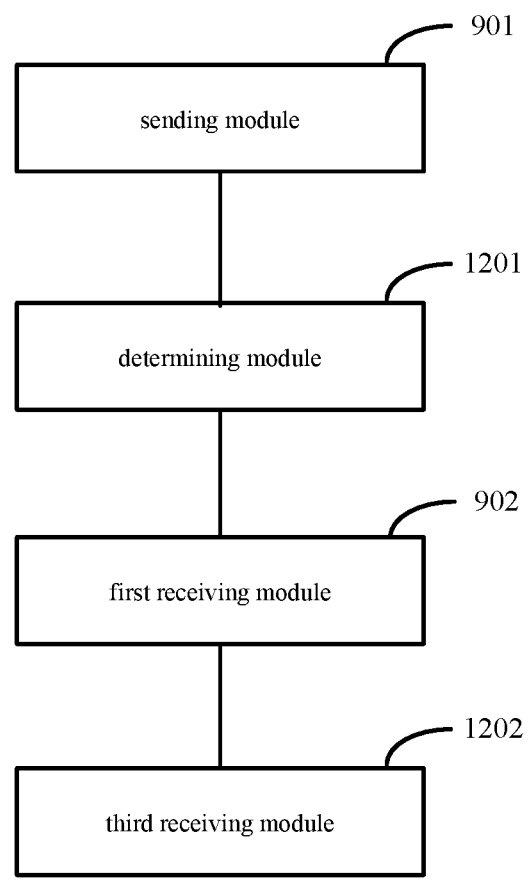
FIG. 12 is a block diagram showing a hybrid automatic repeat request device according to some embodiments.

In some embodiments, as shown in FIG. 12, the device further includes: a determining module 1201 and a third receiving module 1202.

The determining module 1201 is configured to determine whether the retransmitted data is received on the first carrier within a preset time period.

The third receiving module 1202 is configured to receive the retransmitted data on the third carrier when the retransmitted data is not received on the first carrier within the preset time period.

Regarding the device in the above embodiments, a specific manner in which each module performs operation has been described in detail in the embodiments of the method, and detailed description will not be given here.

Figure 13:
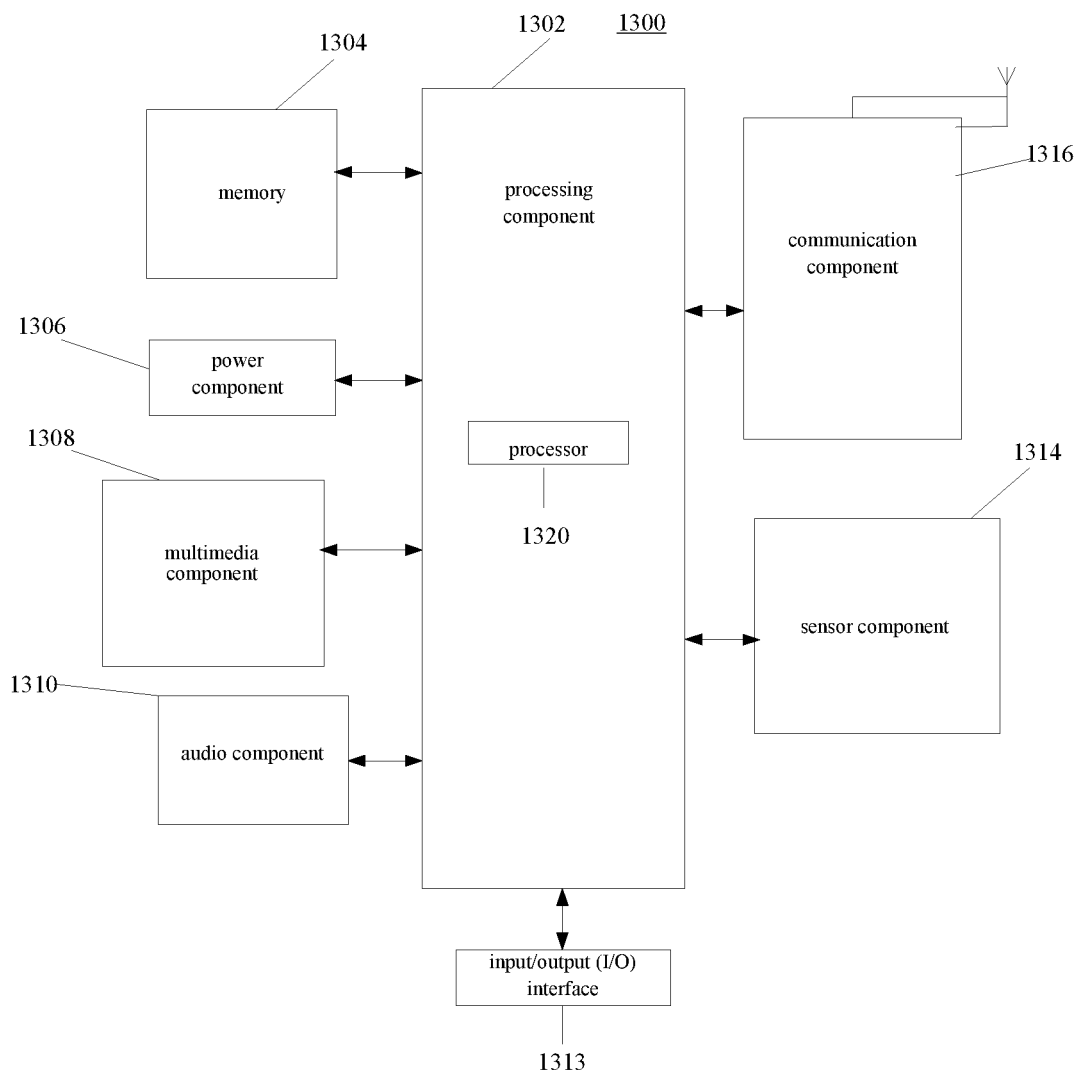
FIG. 13 is a block diagram showing a device suitable for hybrid automatic repeat request according to some embodiments.

FIG. 13 is a block diagram showing a device for hybrid automatic repeat request according to some embodiments. For example, the device 1300 may be a mobile phone, a computer, a digital broadcasting terminal, a messaging device, a game console, a tablet device, a medical device, a fitness device, a personal digital assistant, etc.

The device 1300 may include one or more of the following components: a processing component 1302, a memory 1304, a power component 1306, a multimedia component 1308, an audio component 1310, an input/output (I/O) interface 1313, a sensor component 1314, and a communication component 1316.

The processing component 1302 typically controls the overall operations of the device 1300, such as the operations associated with display, telephone calls, data communications, camera operations, and recording operations. The processing component 1302 can include one or more processors 1320 to execute instructions to perform all or part of the steps in the above described methods. Moreover, the processing component 1302 can include one or more modules to facilitate the interaction between the processing component 1302 and other components. For example, the processing component 1302 can include a multimedia module to facilitate the interaction between the multimedia component 1308 and the processing component 1302.

The memory 1304 is configured to store various types of data to support the operation of the device 1300. Examples of such data include instructions for any application or method operated on device 1300, such as the contact data, the phone book data, messages, pictures, videos, and the like. The memory 1304 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 can include a power management system, one or more power sources, and other components associated with the generation, management, and distribution of power in the device 1300.

The multimedia component 1308 includes a screen providing an output interface between the device 1300 and the user t. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. When the device 1300 is in an operation mode, such as a photographing mode or a video mode, the front camera and/or the rear camera can receive external multimedia datum. Each of the front camera and the rear camera may be a fixed optical lens system or have focus and optical zoom capability.

The audio component 1310 is configured to output and/or input an audio signal. For example, the audio component 1310 includes a microphone (MIC) configured to receive an external audio signal when the device 1300 is in an operation mode, such as a call mode, a recording mode, and a voice recognition mode. The received audio signal may be further stored in the memory 1304 or sent via the communication component 1316. In some embodiments, the audio component 1310 also includes a speaker for outputting the audio signal.

The I/O interface 1313 provides an interface between the processing component 1302 and peripheral interface modules, such as a keyboard, a click wheel, buttons, and the like. These buttons may include, but are not limited to, a home button, a volume button, a starting button, and a locking button.

The sensor component 1314 includes one or more sensors for providing status assessments of various aspects of the device 1300. For example, the sensor component 1314 can detect an open/closed status of the device 1300, relative positioning of components, such as the display and the keypad of the device 1300. The sensor component 1314 can also detect a change in position of one component of the device 1300 or the device 1300, the presence or absence of user contact with the device 1300, an orientation, or an acceleration/deceleration of the device 1300, and a change in temperature of the device 1300. The sensor component 1314 can include a proximity sensor configured to detect the presence of nearby objects without any physical contact. The sensor component 1314 can also include a light sensor, such as a CMOS or CCD image sensor, configured to use in imaging applications. In some embodiments, the sensor component 1314 can also include an accelerometer sensor, a gyroscope sensor, a magnetic sensor, a pressure sensor, or a temperature sensor.

The communication component 1316 is configured to facilitate wired or wireless communication between the device 1300 and other devices. The device 1300 can access a wireless network based on a communication standard, such as WiFi, 2G or 3G, or a combination thereof. In some embodiments, the communication component 1316 receives broadcast signals or broadcast associated information from an external broadcast management system via a broadcast channel. In some embodiments, the communication component 1316 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device 1300 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, and be configured to implement the above method.

In some embodiments, there is also provided a non-transitory computer-readable storage medium including instructions, such as a memory 1304 including instructions executable by the processor 1320 of the device 1300 to perform the above described method. For example, the non-transitory computer readable storage medium may be a ROM, a random access memory (RAM), a CD-ROM, a magnetic tape, a floppy disc, and an optical data storage device.

In some embodiments, there is provided a hybrid automatic repeat request device, including:

a processor; and a memory configured to store executable instructions of the processor;

the processor is configured to:

send failure indication information indicating a transmission failure of downlink data on a first carrier of the multiple carriers to a base station; and receive a retransmission scheduling instruction sent by the base station on a second carrier, and the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

The processor may also be configured to, before the receiving the retransmission scheduling instruction sent by the base station on the second carrier:

monitor the second carrier pre-configured and associated with the first carrier; and/or monitor the second carrier other than the first carrier among the multiple carriers.

The processor may also be configured that:

the retransmission indication information includes: a first resource identifier and/or a second resource identifier;

the first resource identifier indicates to retransmit the data on the third carrier; and the second resource identifier indicates that the retransmitted data is data that has been transmitted on the first carrier and has not been successfully received by the user equipment.

The processor may also be configured that:

the first resource identifier includes: a first carrier identifier, and/or, a first hybrid automatic repeat request process identifier; and the second resource identifier includes: a second carrier identifier, and/or, a second hybrid automatic repeat request process identifier.

The processor may also be configured that:

the first hybrid automatic repeat request process identifier and the second hybrid automatic repeat request process identifier are unique among multiple hybrid automatic repeat request processes supported by the multiple carriers; or the first hybrid automatic repeat request process identifier and the second hybrid automatic repeat request process identifier are unique among multiple hybrid automatic repeat request processes supported by one carrier.

The processor may also be configured that:

the retransmission scheduling instruction is a retransmission scheduling instruction specifically for cross-carrier data retransmission; or the retransmission scheduling instruction includes an indicator bit, and when the indicator bit takes a first value, it indicates that the retransmission scheduling instruction is a retransmission scheduling instruction for the cross-carrier data retransmission; when the indicator bit takes a second value, it indicates that the retransmission scheduling instruction is a retransmission scheduling instruction for single carrier data retransmission; or a cyclic redundancy check (CRC) in the retransmission scheduling instruction is scrambled with a sequence, and the sequence is a sequence specifically for the cross-carrier data retransmission.

The processor may also be configured to:
receive the retransmitted data on the third carrier.

The processor may also be configured to:
determine whether the retransmitted data is received on the first carrier within a preset time period; and the receiving the retransmitted data on the third carrier includes:

receiving the retransmitted data on the third carrier when the retransmitted data is not received on the first carrier within the preset time period.

Therein is provided a computer-readable storage medium, and instructions in the storage medium, when executed by a processor of a device, cause the device to execute the aforementioned hybrid automatic repeat request method, and the method includes:

sending failure indication information indicating a transmission failure of downlink data on a first carrier of the multiple carriers to a base station; and receiving a retransmission scheduling instruction sent by the base station on a second carrier, and the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

The instructions in the storage medium may also include, before the receiving the retransmission scheduling instruction sent by the base station on the second carrier:

monitoring the second carrier pre-configured and associated with the first carrier; and/or monitoring the second carrier other than the first carrier among the multiple carriers.

The instructions in the storage medium may also include:

the retransmission indication information includes: a first resource identifier and/or a second resource identifier;

the first resource identifier indicates to retransmit the data on the third carrier; and the second resource identifier indicates that the retransmitted data is data that has been transmitted on the first carrier and has not been successfully received by the user equipment.

The instructions in the storage medium may also include:

the first resource identifier includes: a first carrier identifier, and/or, a first hybrid automatic repeat request process identifier; and the second resource identifier includes: a second carrier identifier, and/or, a second hybrid automatic repeat request process identifier.

The instructions in the storage medium may also include:

the first hybrid automatic repeat request process identifier and the second hybrid automatic repeat request process identifier are unique among multiple hybrid automatic repeat request processes supported by the multiple carriers; or the first hybrid automatic repeat request process identifier and the second hybrid automatic repeat request process identifier are unique among multiple hybrid automatic repeat request processes supported by one carrier.

The instructions in the storage medium may also include:

the retransmission scheduling instruction is a retransmission scheduling instruction specifically for cross-carrier data retransmission; or the retransmission scheduling instruction includes an indicator bit, and when the indicator bit takes a first value, it indicates that the retransmission scheduling instruction is a retransmission scheduling instruction for the cross-carrier data retransmission; when the indicator bit takes a second value, it indicates that the retransmission scheduling instruction is a retransmission scheduling instruction for single carrier data retransmission; or a cyclic redundancy check (CRC) in the retransmission scheduling instruction is scrambled with a sequence, and the sequence is a sequence specifically for the cross-carrier data retransmission.

The instructions in the storage medium may also include:
receiving the retransmitted data on the third carrier.

The instructions in the storage medium may also include:
determining whether the retransmitted data is received on the first carrier within a preset time period;

the receiving the retransmitted data on the third carrier includes:

receiving the retransmitted data on the third carrier when the retransmitted data is not received on the first carrier within the preset time period.

Figure 14:
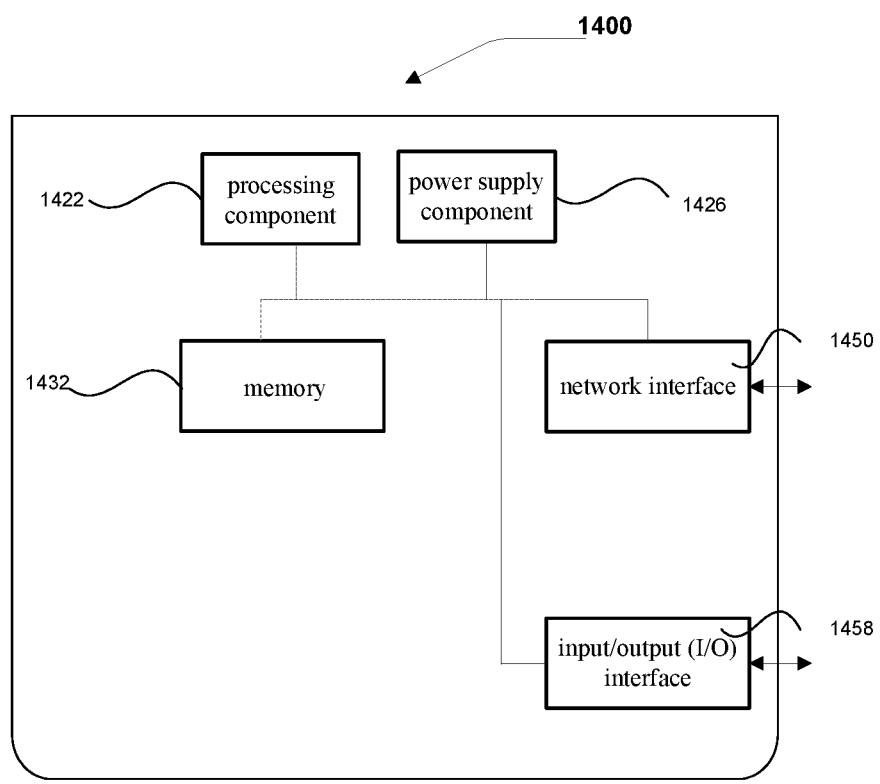
FIG. 14 is a block diagram showing a device suitable for hybrid automatic repeat request according to some embodiments.

FIG. 14 is a block diagram showing a device 1400 for hybrid automatic repeat request according to some embodiments. For example, the device 1400 may be provided as a computer. Referring to FIG. 14, the device 1400 includes a processing component 1422, which further includes one or more processors, and a memory resource represented by a memory 1432 for storing instructions (such as an application program) executable by the processing component 1422. The application program stored in the memory 1432 may include one or more modules each corresponding to a set of instructions. In addition, the processing component 1422 is configured to execute instructions to perform the aforementioned hybrid automatic repeat request method.

The device 1400 may also include a power supply component 1426 configured to perform power management of the device 1400, a wired or wireless network interface 1450 configured to connect the device 1400 to a network, and an input/output (I/O) interface 1458. The device 1400 can operate based on an operating system stored in the memory 1432, such as Windows Server™, Mac OS X™, Unix™, Linux™, FreeBSD™ or the like.

In some embodiments, there is provided a hybrid automatic repeat request device, including:

a processor; and a memory configured to store executable instructions of the processor;

the processor is configured to:

generate a retransmission scheduling instruction after receiving failure indication information sent by a user equipment indicating a transmission failure of downlink data on a first carrier of the multiple carriers; and send the retransmission scheduling instruction to the UE on a second carrier, and the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

The processor may also be configured that:
the second carrier is a pre-configured carrier associated with the first carrier; and/or
the second carrier is a carrier determined according to a resource occupancy of each carrier of the multiple carriers.

The processor may also be configured that:
the retransmission indication information includes: a first resource identifier and/or a second resource identifier;
the first resource identifier indicates to retransmit the data on the third carrier; and
the second resource identifier indicates that the retransmitted data is data that has been transmitted on the first carrier and has not been successfully received by the user equipment.

The processor may also be configured that:
the first resource identifier includes: a first carrier identifier, and/or, a first hybrid automatic repeat request process identifier; and
the second resource identifier includes: a second carrier identifier, and/or, a second hybrid automatic repeat request process identifier.

The processor may also be configured that:
the first hybrid automatic repeat request process identifier and the second hybrid automatic repeat request process identifier are unique among multiple hybrid automatic repeat request processes supported by the multiple carriers; or
the first hybrid automatic repeat request process identifier and the second hybrid automatic repeat request process identifier are unique among multiple hybrid automatic repeat request processes supported by one carrier.

The processor may also be configured that:
the retransmission scheduling instruction is a retransmission scheduling instruction specifically for cross-carrier data retransmission; or
the retransmission scheduling instruction includes an indicator bit, and when the indicator bit takes a first value, it indicates that the retransmission scheduling instruction is a retransmission scheduling instruction for the cross-carrier data retransmission; when the indicator bit takes a second value, it indicates that the retransmission scheduling instruction is a retransmission scheduling instruction for single carrier data retransmission; or
a cyclic redundancy check (CRC) in the retransmission scheduling instruction is scrambled with a sequence, and the sequence is a sequence specifically for the cross-carrier data retransmission.

The processor may also be configured to:
retransmit the data on the third carrier.

The processor may also be configured to:
determine whether there is an idle resource for retransmitting the data on the first carrier within a preset time period; and
retransmit the data on the third carrier when there is no idle resource for retransmitting the data on the first carrier within the preset time period.

Therein is provided a computer-readable storage medium, and instructions in the storage medium, when executed by a processor of a device, cause the device to execute the aforementioned hybrid automatic repeat request method, and the method includes:

generating a retransmission scheduling instruction after receiving failure indication information sent by a user equipment indicating a transmission failure of downlink data on a first carrier of the multiple carriers;

sending the retransmission scheduling instruction to the UE on a second carrier, and the retransmission scheduling instruction includes retransmission indication information on performing a retransmission on a third carrier, the first carrier and the second carrier are a same carrier or different carriers, the second carrier and the third carrier are a same carrier or different carriers, and the first carrier and the third carrier are different carriers.

The instructions in the storage medium may also include:
the second carrier is a pre-configured carrier associated with the first carrier; and/or
the second carrier is a carrier determined according to a resource occupancy of each carrier of the multiple carriers.

The instructions in the storage medium may also include:
the retransmission indication information includes: a first resource identifier and/or a second resource identifier;
the first resource identifier indicates to retransmit the data on the third carrier; and
the second resource identifier indicates that the retransmitted data is data that has been transmitted on the first carrier and has not been successfully received by the user equipment.

The instructions in the storage medium may also include:
the first resource identifier includes: a first carrier identifier, and/or, a first hybrid automatic repeat request process identifier; and
the second resource identifier includes: a second carrier identifier, and/or, a second hybrid automatic repeat request process identifier.

The instructions in the storage medium may also include:
the first hybrid automatic repeat request process identifier and the second hybrid automatic repeat request process identifier are unique among multiple hybrid automatic repeat request processes supported by the multiple carriers; or
the first hybrid automatic repeat request process identifier and the second hybrid automatic repeat request process identifier are unique among multiple hybrid automatic repeat request processes supported by one carrier.

The instructions in the storage medium may also include:
the retransmission scheduling instruction is a retransmission scheduling instruction specifically for cross-carrier data retransmission; or
the retransmission scheduling instruction includes an indicator bit, and when the indicator bit takes a first value, it indicates that the retransmission scheduling instruction is a retransmission scheduling instruction for the cross-carrier data retransmission; when the indicator bit takes a second value, it indicates that the retransmission scheduling instruction is a retransmission scheduling instruction for single carrier data retransmission; or
a cyclic redundancy check (CRC) in the retransmission scheduling instruction is scrambled with a sequence, and the sequence is a sequence specifically for the cross-carrier data retransmission.

The instructions in the storage medium may also include:
retransmitting the data on the third carrier.

The instructions in the storage medium may also include:
determining whether there is an idle resource for retransmitting the data on the first carrier within a preset time period; and retransmitting the data on the third carrier when there is no idle resource for retransmitting the data on the first carrier within the preset time period.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative.

It should be understood that the present disclosure is not limited to the precise structures that have been described above and shown in the drawings, and various modifications and changes can be made without departing from the scope thereof

What is claimed is:

1. A hybrid automatic repeat request method, applied to a base station supporting multiple carriers, and comprising:
    generating a retransmission scheduling instruction in response to receiving failure indication information sent by a user equipment indicating a transmission failure of downlink data on a first carrier of the multiple carriers;
    sending the retransmission scheduling instruction to the user equipment on a second carrier that is determined from a plurality of second carriers, in the multiple carriers, associated with the first carrier according to a resource occupancy of each one of the plurality of second carriers, wherein the first carrier is any carrier of the multiple carriers, the retransmission scheduling instruction comprises retransmission indication information on performing a retransmission on a third carrier, the first carrier and the second carrier are different carriers, the second carrier and the third carrier are a same carrier or different carriers, and the first carrier and the third carrier are different carriers; wherein
    the retransmission scheduling instruction comprises an indicator bit, and when the indicator bit takes a first value, it indicates that the retransmission scheduling instruction is a retransmission scheduling instruction for cross-carrier data retransmission, when the indicator bit takes a second value, it indicates that the retransmission scheduling instruction is a retransmission scheduling instruction for single carrier data retransmission; and
    an instruction format of the retransmission scheduling instruction is used for indicating to the user equipment a strategy for receiving retransmitted data.

2. The method according to claim 1, wherein the retransmission indication information comprises: a first resource identifier and/or a second resource identifier;
    the first resource identifier indicates to retransmit the data on the third carrier; and
    the second resource identifier indicates that the retransmitted data is data that has been transmitted on the first carrier and has not been successfully received by the user equipment.

3. The method according to claim 2, wherein the first resource identifier comprises: a first carrier identifier, and/or, a first hybrid automatic repeat request process identifier; and
    the second resource identifier comprises: a second carrier identifier, and/or, a second hybrid automatic repeat request process identifier.

4. The method according to claim 2, wherein the first resource identifier comprises a first hybrid automatic repeat request process identifier, the second resource identifier comprises a second hybrid automatic repeat request process identifier, and the first hybrid automatic repeat request process identifier and the second hybrid automatic repeat request process identifier are unique among multiple hybrid automatic repeat request processes supported by the multiple carriers; or
    the first resource identifier comprises a first carrier identifier and a first hybrid automatic repeat request process identifier, the second resource identifier comprises a second carrier identifier and a second hybrid automatic repeat request process identifier, and the first hybrid automatic repeat request process identifier and the second hybrid automatic repeat request process identifier are unique among multiple hybrid automatic repeat request processes supported by one carrier.

5. The method according to claim 1, wherein the method further comprises:
    retransmitting the data on the third carrier.

6. The method according to claim 1, wherein the method further comprises:
    determining whether there is an idle resource for retransmitting the data on the first carrier within a preset time period; and
    retransmitting the data on the third carrier in response that there is no idle resource for retransmitting the data on the first carrier within the preset time period.

7. A hybrid automatic repeat request method, applied to a user equipment supporting multiple carriers and comprising:
    sending failure indication information indicating a transmission failure of downlink data on a first carrier of the multiple carriers to a base station;
    monitoring a second carrier that is used for receiving a retransmission scheduling instruction and is determined from a plurality of second carriers, in the multiple carriers, associated with the first carrier according to a resource occupancy of each one of the plurality of second carriers; wherein the first carrier is any carrier of the multiple carriers, the retransmission scheduling instruction comprises retransmission indication information on performing a retransmission on a third carrier, the first carrier and the second carrier are different carriers, the second carrier and the third carrier are a same carrier or different carriers, and the first carrier and the third carrier are different carriers;

receiving the retransmission scheduling instruction sent by the base station on the second carrier; wherein the retransmission scheduling instruction comprises an indicator bit, and when the indicator bit takes a first value, it indicates that the retransmission scheduling instruction is a retransmission scheduling instruction for cross-carrier data retransmission, when the indicator bit takes a second value, it indicates that the retransmission scheduling instruction is a retransmission scheduling instruction for single carrier data retransmission; and an instruction format of the retransmission scheduling instruction is used for indicating to the user equipment a strategy for receiving retransmitted data.

8. The method according to claim 7, wherein the retransmission indication information comprises: a first resource identifier and/or a second resource identifier;

the first resource identifier indicates to retransmit the data on the third carrier; and the second resource identifier indicates that the retransmitted data is data that has been transmitted on the first carrier and has not been successfully received by the user equipment.

9. The method according to claim 8, wherein the first resource identifier comprises: a first carrier identifier, and/or, a first hybrid automatic repeat request process identifier; and the second resource identifier comprises: a second carrier identifier, and/or, a second hybrid automatic repeat request process identifier.

10. The method according to claim 8, wherein the first resource identifier comprises a first hybrid automatic repeat request process identifier, the second resource identifier comprises a second hybrid automatic repeat request process identifier, and the first hybrid automatic repeat request process identifier and the second hybrid automatic repeat request process identifier are unique among multiple hybrid automatic repeat request processes supported by the multiple carriers; or the first resource identifier comprises a first carrier identifier and a first hybrid automatic repeat request process identifier, the second resource identifier comprises a second carrier identifier and a second hybrid automatic repeat request process identifier, and the first hybrid automatic repeat request process identifier and the second hybrid automatic repeat request process identifier are unique among multiple hybrid automatic repeat request processes supported by one carrier.

11. The method according to claim 7, wherein the method further comprises:

receiving the retransmitted data on the third carrier.

12. The method according to claim 7, wherein the method further comprises:

determining whether the retransmitted data is received on the first carrier within a preset time period; and receiving the retransmitted data on the third carrier in response that the retransmitted data is not received on the first carrier within the preset time period.

13. A hybrid automatic repeat request device, comprising:
a processor; and
a memory configured to store executable instructions of the processor;
wherein, the processor is configured to perform the method according to claim 1.

14. A hybrid automatic repeat request device, comprising:
a processor; and
a memory configured to store executable instructions of the processor;
wherein, the processor is configured to:

send failure indication information indicating a transmission failure of downlink data on a first carrier of the multiple carriers to a base station;

monitor a second carrier that is used for receiving a retransmission scheduling instruction and is determined from a plurality of second carriers, in the multiple carriers, associated with the first carrier according to a resource occupancy of each one of the plurality of second carriers; wherein the first carrier is any carrier of the multiple carriers, the retransmission scheduling instruction comprises retransmission indication information on performing a retransmission on a third carrier, the first carrier and the second carrier are different carriers, the second carrier and the third carrier are a same carrier or different carriers, and the first carrier and the third carrier are different carriers;

receive the retransmission scheduling instruction sent by the base station on the second carrier; wherein the retransmission scheduling instruction comprises an indicator bit, and when the indicator bit takes a first value, it indicates that the retransmission scheduling instruction is a retransmission scheduling instruction for cross-carrier data retransmission, when the indicator bit takes a second value, it indicates that the retransmission scheduling instruction is a retransmission scheduling instruction for single carrier data retransmission; and an instruction format of the retransmission scheduling instruction is used for indicating to the user equipment a strategy for receiving retransmitted data.

15. The device according to claim 14, wherein the retransmission indication information comprises: a first resource identifier and/or a second resource identifier;

the first resource identifier indicates to retransmit the data on the third carrier; and the second resource identifier indicates that the retransmitted data is data that has been transmitted on the first carrier and has not been successfully received by the user equipment.

* * * * *